(12) United States Patent
Keri et al.

(10) Patent No.: US 11,704,077 B2
(45) Date of Patent: Jul. 18, 2023

(54) RASTERIZED PRINT JOB COMPRESSION

(71) Applicants: Iosif Keri, Boulder, CO (US); David Ward, Broomfield, CO (US); Justin J. Coulter, Longmont, CO (US)

(72) Inventors: Iosif Keri, Boulder, CO (US); David Ward, Broomfield, CO (US); Justin J. Coulter, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/506,055

(22) Filed: Oct. 20, 2021

(65) Prior Publication Data

US 2023/0122930 A1    Apr. 20, 2023

(51) Int. Cl.
  *G06F 3/12* (2006.01)
(52) U.S. Cl.
  CPC ............ *G06F 3/122* (2013.01); *G06F 3/1258* (2013.01); *G06F 3/1286* (2013.01)
(58) Field of Classification Search
  CPC . G06F 40/163; G06F 3/1297; H04N 1/32101; H04N 1/32277
  USPC .............. 358/1.15, 1.9, 2.1, 3.23, 1.18, 538; 382/166, 173, 176, 180, 244
  See application file for complete search history.

(56) References Cited

U.S. PATENT DOCUMENTS

| | | | |
|---|---|---|---|
| 5,870,535 A * | 2/1999 | Duffin ................... | G06K 15/02 358/1.16 |
| 5,936,605 A * | 8/1999 | Munjal .................. | G06T 9/008 345/102 |
| 6,272,252 B1 | 8/2001 | Eldridge et al. | |
| 6,327,043 B1 * | 12/2001 | Rumph ............. | G06K 15/1848 358/1.9 |
| 6,721,456 B1 | 4/2004 | Aschenbrenner et al. | |
| 6,919,825 B2 | 7/2005 | Su et al. | |
| 6,958,714 B2 | 10/2005 | Umeda | |
| 7,043,077 B2 | 5/2006 | Rijavec | |
| 9,245,214 B2 | 1/2016 | Varga et al. | |
| 10,158,784 B2 | 12/2018 | Dashiell et al. | |
| 11,070,230 B2 | 7/2021 | Amaral et al. | |
| 2011/0007344 A1 | 1/2011 | Wilson et al. | |
| 2015/0302279 A1 | 10/2015 | Holley et al. | |

OTHER PUBLICATIONS

PackBits; Wikipedia; Aug. 23, 2021.

* cited by examiner

*Primary Examiner* — Jamares Q Washington
(74) *Attorney, Agent, or Firm* — Duft & Bornsen, PC

(57) ABSTRACT

Systems and methods are provided for handling print data. One embodiment is a system that includes an interface that receives rasterized print data, a memory that stores the rasterized print data; and a print controller that compresses each scanline of the rasterized print data by culling a region of leading whitespace, culling a region of trailing whitespace, compressing a data region disposed between the leading whitespace and the trailing whitespace, and inserting a tag having whitespace offset information for the data region within the scanline.

20 Claims, 9 Drawing Sheets

FIG. 6
UNCOMPRESSED SCANLINES
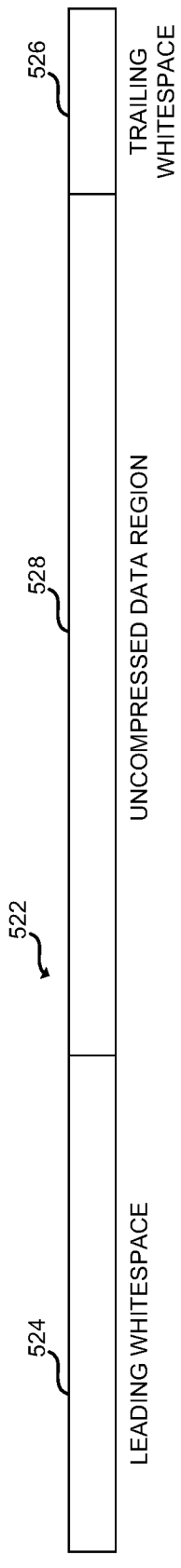
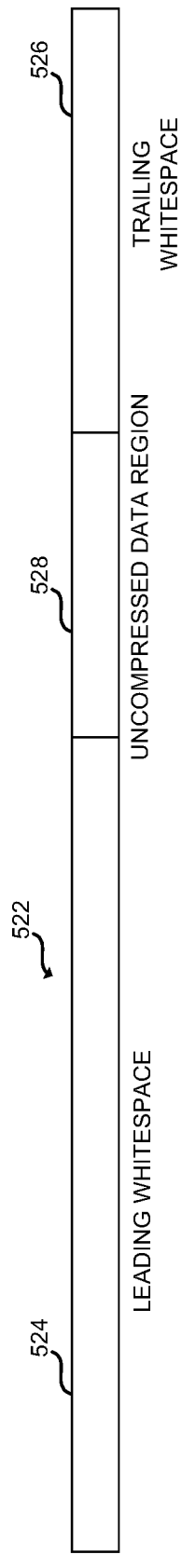
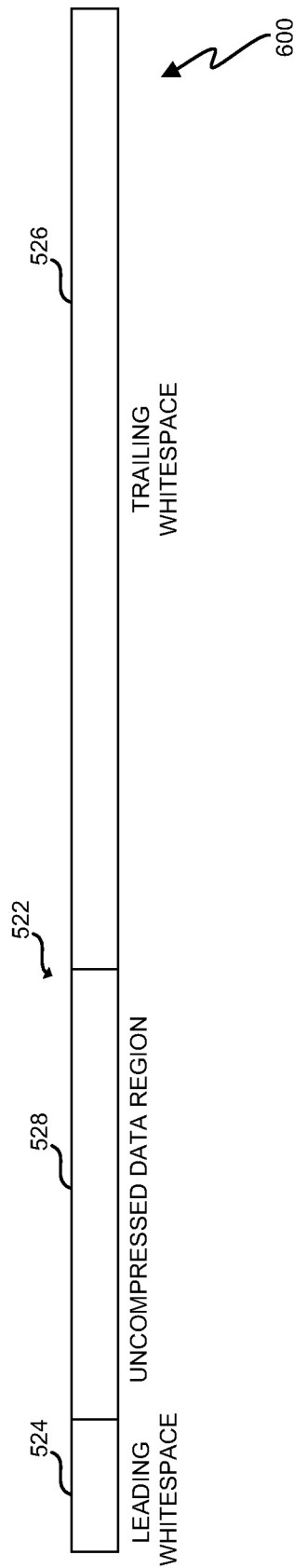

RASTERIZED PRINT JOB COMPRESSION

Technical Field

The following disclosure relates to the field of printing, and in particular, to compression of bitmaps of print data.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes print data of the print job (e.g., to create bitmaps representing each page of the job), and the marking engine operates individual printheads to mark the web based on the rasterized print data. Thus, the printer marks physical pages based on the digital information of the print job.

Physical memory at a production printer remains a valuable resource, because physical memory stores rasterized print data for print jobs in a format which may be immediately printed. However, the rasterized print data for an entire print job comprise a massive amount of data (e.g., many gigabytes). Thus, while print shop operators may desire to store rasterized print data for multiple print jobs in physical memory at once, the number of print jobs that can be stored in a rasterized format is limited by the size of each print job being stored. If a print job is not stored in rasterized format before printing, it must be rasterized at the time of printing, which results in a printing delay. Thus, print shop operators continue to seek out solutions that balance these concerns.

SUMMARY

Embodiments described herein provide for systems and method that reduce the size of rasterized logical pages in the form of bitmaps stored in memory. This in turn enables for a larger amount of rasterized print data to be stored, for example, in the physical memory of a printer, which increases the number of print jobs that may be queued for immediate printing at the printer.

One embodiment is a system that includes an interface that receives rasterized print data, a memory that stores the rasterized print data; and a print controller that compresses each scanline of the rasterized print data by culling a region of leading whitespace, culling a region of trailing whitespace, compressing a data region disposed between the leading whitespace and the trailing whitespace, and inserting a tag having whitespace offset information for the data region within the scanline.

A further embodiment is a method that includes storing rasterized print data, and compressing each scanline of the rasterized print data, by: culling a region of leading whitespace, culling a region of trailing whitespace, compressing a data region disposed between the leading whitespace and the trailing whitespace, and inserting a tag having whitespace offset information for the data region within the scanline.

A further embodiment is a non-transitory computer readable medium embodying programmed instructions which, when executed by a processor, are operable for performing a method. The method includes storing rasterized print data, and compressing each scanline of the rasterized print data, by: culling a region of leading whitespace, culling a region of trailing whitespace, compressing a data region disposed between the leading whitespace and the trailing whitespace, and inserting a tag having whitespace offset information for the data region within the scanline.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 6 is a diagram that depicts uncompressed scanlines in illustrative embodiments.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
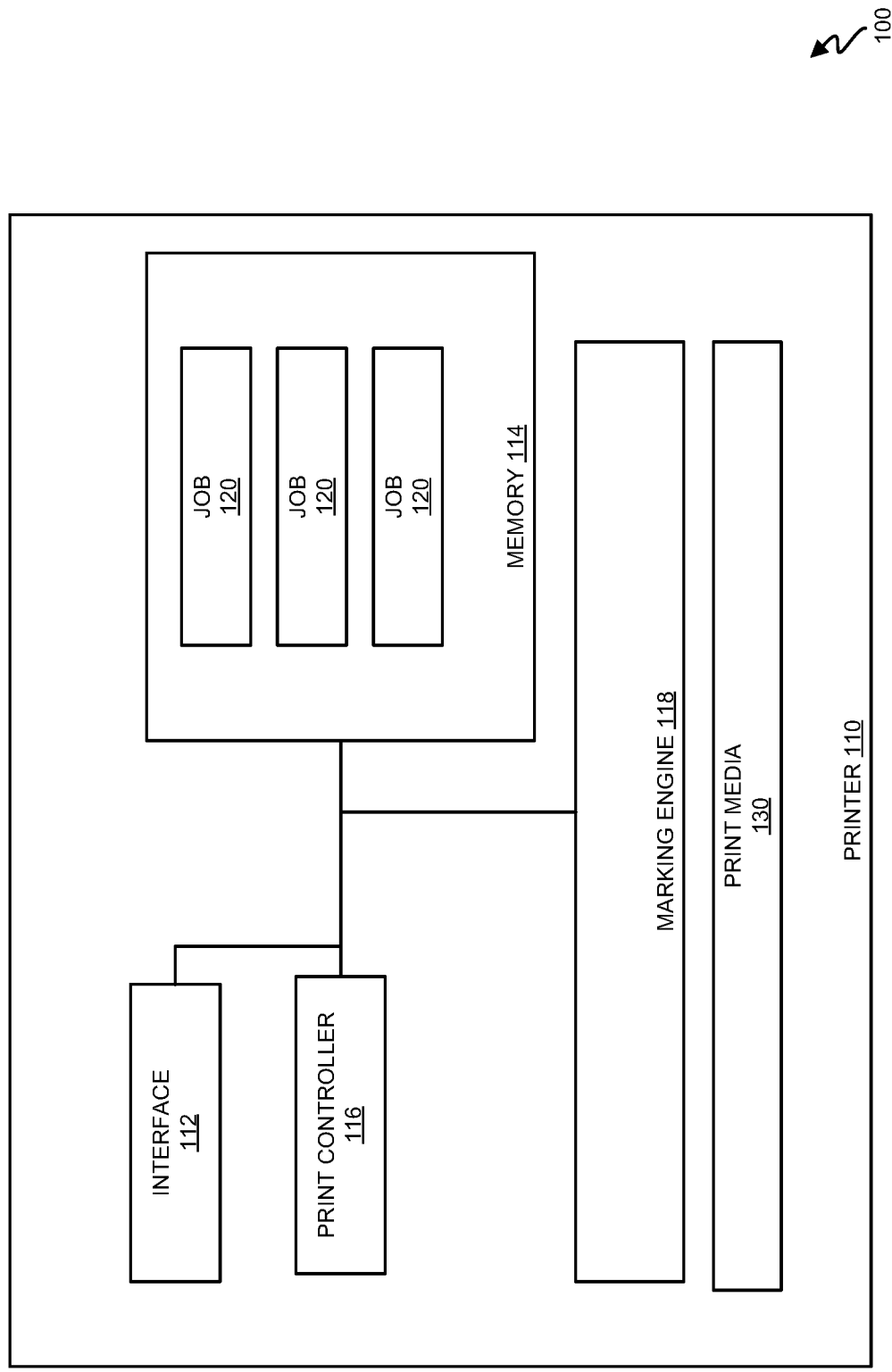
FIG. 1 is a block diagram of a printing system in an illustrative embodiment.

FIG. 1 is a block diagram of a printing system 100 in an illustrative embodiment. Printing system 100 comprises any system, device, or component operable to receive print data, process the print data, and mark pages of print media based on the print data. Printing system 100 has been beneficially enhanced to compress bitmap data (i.e., rasterized print data) for a print job in a novel manner that reduces the amount of space occupied by bitmaps in memory. This provides a technical benefit by enabling the storage of a greater number of print jobs in a rasterized format in memory 114, which enhances overall throughput of the printing system 100 throughout the day.

In this embodiment, printing system 100 comprises a printer 110 for rasterizing incoming print data to generate bitmaps, and marking print media 130 in accordance with the bitmaps to complete a print job. Printer 110 comprises any system, device, or component operable to mark print media (e.g., paper, card stock, paper board, corrugated fiberboard, film, plastic, synthetic, textile, glass, composite or any other tangible medium suitable for printing) in accordance with received instructions in print data for a print job. As used herein, "print data" refers to digital information indicating how to mark print media, and may comprise Page Description Language (PDL) data, information in a job ticket, or other formats. In some embodiments, the print data received by the printer has already been rasterized into bitmaps and hence is not rasterized by the printer 110.

Print data is received via interface 112, such as an Ethernet or other wired or wireless interface for exchanging digital data. Print data received at interface 112 may be stored in memory 114 as PDL data, or may be rasterized by the print controller 116 and then stored in a rasterized format (e.g., as one or more bitmaps). Rasterized print data is ready for immediate handling by a marking engine 118 of the printer, while PDL print data must be rasterized before use. Rasterized print data occupies substantially more space in memory 114 (e.g., orders of magnitude more) than PDL print data. Thus, only a limited number of jobs 120 may be stored in memory 114 in a rasterized form.

In one embodiment, printer 110 comprises a continuous-forms printer that marks a web of print media 130 which travels through the printer 110 in a web direction (also referred to as a "process direction"). The print controller 116 directs the operations of one or more marking engines 118, which each comprise one or more arrays of printheads. The printheads may operate nozzles to eject ink or other marking materials onto the print media 130 in accordance with instructions from the print controller as the print media advances. In further embodiments, printer 110 comprises a cut-sheet printer that marks sheets or strips of print media. The print controller 116 may be implemented as custom circuitry, as a hardware processor executing programmed instructions, etc.

The particular arrangement, number, and configuration of components described herein is illustrative and non-limiting. Illustrative details of the operation of printing system 100 will be discussed with regard to FIGS. 2-3. Assume, for this embodiment, that PDL print data, and/or a Job Definition Format (JDF) or other job ticket, have been transmitted from a print server to the printing system 100 for placement into a print queue. This data is then received at the printing system 100 for storage.

Figure 2:
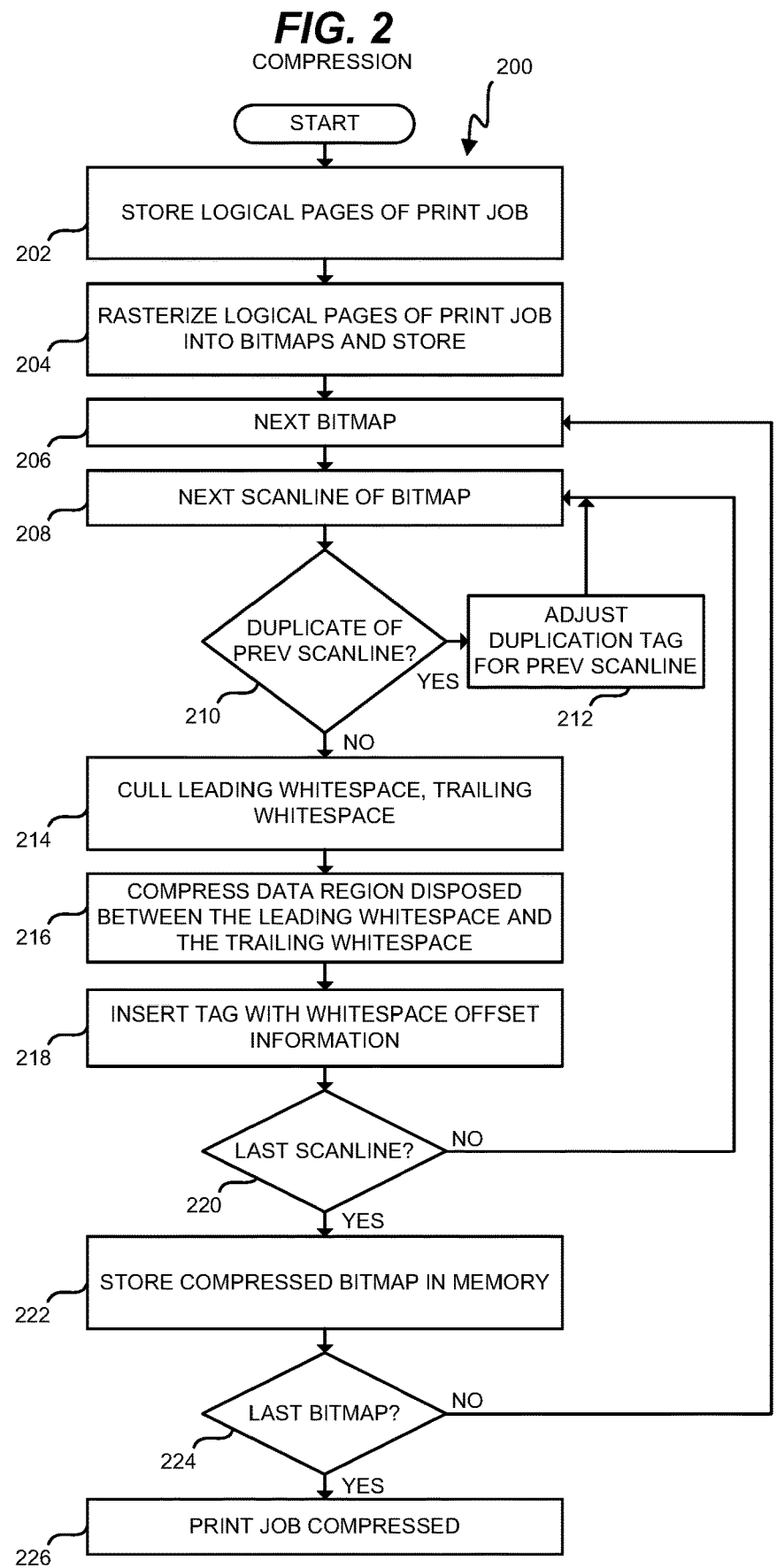
FIG. 2 is a flowchart illustrating a method for operating a printing system to compress bitmaps for a print job in an illustrative embodiment.

FIG. 2 is a flowchart illustrating a method 200 for operating a printing system to compress bitmaps for a print job in an illustrative embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, the interface 112 of the printer 110 stores logical pages of the print job. A logical page provides data for a single page of the print job, for rasterizing into a sheetside bitmap for the print job. For some print jobs, such as those which utilize N-up printing, multiple logical pages are arranged together for rasterizing onto a single sheetside bitmap. Print jobs that utilize duplex printing may have two sheetside bitmaps per printed physical sheet (e.g., one sheetside bitmap per printed side of the print media 130).

In step 204, the print controller 116 rasterizes the logical pages of the print job into bitmaps and stores the bitmaps in memory 114. Each bitmap may represent one of a plurality of color planes (e.g., a color planes for each of a plurality of marking material types such as C,M,Y or K in a color printer). The bitmaps may be stored in TIFF or any other suitable image file format. Rasterizing the logical pages of the print job comprises interpreting instructions in PDL data in order to generate bitmaps for marking onto print media. Step 204 represents a processing-intensive process which may require a substantial amount of time, depending on the print job being handled. Once the bitmaps for the print job have been created, these bitmaps are ready for compression.

In step 206, the print controller 116 selects a next bitmap of the print job for compression. For example, the print controller 116 may select a next bitmap representing a next logical page or sheetside of the print job. In at least one embodiment, each bitmap corresponds with a logical page of the print job, and the print controller 116 is configured to perform compression of each scanline of each bitmap for the print job. By performing compression on a scanline-by-scanline basis, the print controller 116 is capable of substantially compressing each bitmap of the print job. Furthermore, the processing load for decompressing the bitmaps is substantially less intensive than that required by rasterization processes. Thus, the act of decompressing the bitmaps will result in little or no printing delay at the printer 110.

In step 208, the print controller 116 reviews a next scanline of the current bitmap. A scanline comprises a single line of pixel data for a bitmap, such as a horizontal row of pixels and may proceed in a direction perpendicular to a process direction for the print media 130.

In step 210, the print controller 116 determines whether or not the next scanline is a duplicate of the previous scanline in the bitmap. In one embodiment, this comprises checking to determine whether the contents of the next scanline exactly match that of the previous scanline. As used herein, the previous scanline is the scanline that was most recently compressed for the bitmap. Thus, the previous scanline is either adjacent to the next scanline, or exactly corresponds with a scanline adjacent to the next scanline.

In step 212, if the next scanline is a duplicate, the print controller 116 foregoes compressing the next scanline and deletes the next scanline. The print controller 116 then adjusts a duplication tag that is maintained for the previous scanline. In certain circumstances, the print controller 116 may prevent deletion of the next scanline. For example, if the bitmap comprises rasterized print data in the form of Tag Image File Format (TIFF) images, the print controller 116 may prevent deleting the next scanline in response to determining that the next scanline is separated from the previous scanline by a TIFF strip boundary. A TIFF image is composed of one or more strips where the TIFF strip (or band) is a subsection of the image composed of one or more rows. Each TIFF strip may be compressed independently of the entire image and each begins on a byte boundary (e.g., TIFF strip boundary).

Alternatively, if the next scanline is not a duplicate of the previous scanline, the print controller 116 analyzes the next scanline to detect the presence of leading whitespace and trailing whitespace in the next scanline. Then, in step 214 the print controller 116 culls/removes a region of leading whitespace (e.g., all leading whitespace) and culls/removes a region of trailing whitespace (e.g., all trailing whitespace) from the next scanline. Many print jobs include margins at borders of the print media 130, in which no ink or other marking is applied. Thus, the rasterized print data for many scanlines starts with a series of blank pixels (e.g., pixels set to a predefined value which indicates no ink should be applied), and also end with a series of blank pixels. Thus, leading whitespace and trailing whitespace refer to the first contiguous group of blank pixels within the scanline, and the last contiguous group of blank pixels within the scanline. In this sense, "whitespace" does not refer to a need for the underlying print media 130 to be white, or for white ink to be applied, but rather refers to spaces in which no ink is applied (or other marking performed) by the marking engine 118.

In step 216, the print controller 116 compresses the remaining portion of the scanline that was disposed between the leading whitespace and the trailing whitespace. The remaining portion is referred to herein as the "data region" of the scanline. By removing the leading whitespace and trailing whitespace entirely from the scanline prior to compression, the size of the data region compressed by the print controller 116 (e.g., according to a PackBits compression scheme) is beneficially reduced. This provides a technical benefit by reducing the amount of space occupied by the scanline in memory 114.

In step 218, the print controller 116 generates and inserts a tag having whitespace offset information for the data region within the scanline. Whitespace offset information may refer to a memory address, pixel location, or byte offset for the first non-whitespace pixel in the scanline, a memory address, pixel location, or byte offset of the last non-whitespace pixel in the scanline, and/or a distance between the first non-whitespace pixel and the last non-whitespace pixel in the scanline. These distances or measures may be indicated in values representing a number of bytes, or may be indicated via other techniques. The tag (e.g., a whitespace offset tag and/or duplication tag) may then be inserted into the compressed scanline before or after the compressed data region (i.e., the compressed non-whitespace data). For example, the tag may be implemented as a header or footer for the compressed scanline.

In step 220, the print controller 116 determines whether it has reached the last scanline for the bitmap, for example by checking the bitmap for an end of file flag. If the last scanline has not been reached, the print controller 116 returns to step 208 to compress a next scanline of the bitmap. If the scanline was the last scanline of the bitmap, processing proceeds to step 222, where the compressed bitmap, including all scanlines, is stored in memory 114. The compressed bitmap may be output in the same image file format as the input uncompressed image file format (e.g., TIFF or TIFF extensions) with a technical benefit of allowing a processor to use common processing logic for both.

Next, the print controller 116 the proceeds to determine whether the last bitmap for the print job has been processed in step 224. If not, the print controller 116 proceeds to step 206 to acquire a next bitmap for the print job. Alternatively, if the bitmap that was just compressed and stored is the last bitmap for the print job, the print controller 116 determines that the entire print job has now been compressed in step 226. In further embodiments, the print controller 116 may transmit the scanlines that have been compressed (e.g., on a per-scanline basis, per-bitmap basis, or per-print job basis) to a marking engine 118, a print server, another printer, or other entity.

Rasterization is a highly processing-intensive step. Decompression of a bitmap is notably less processing intensive. Thus, by performing rasterization prior to printing, a technical benefit is provided in that processing resources are conserved and printing delays are reduced. Furthermore, by maintaining the bitmaps in a compressed state, space on memory 114 is also conserved, resulting in a technical benefit allowing for the printer 110 to use less of the memory 114, or to store more rasterized print jobs in the memory 114.

Figure 3:
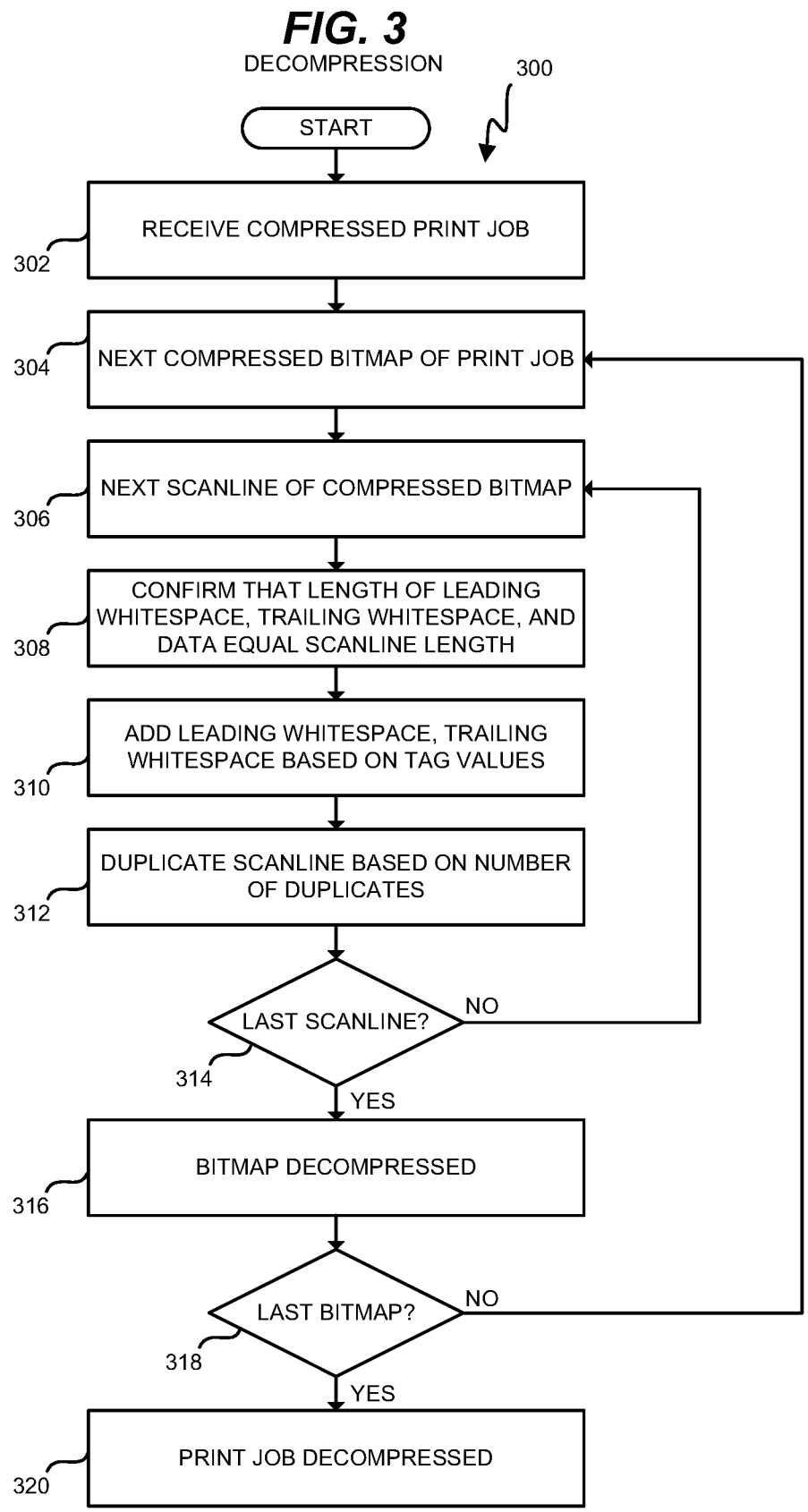
FIG. 3 is a flowchart illustrating a method for operating a printing system to decompress bitmaps for a print job in an illustrative embodiment.

FIG. 3 is a flowchart illustrating a method 300 for operating a printing system 100 to decompress bitmaps for a print job in an illustrative embodiment. This technique may be performed, for example, each time printing initiates for a print job in a print queue in memory 114. Method 300 enables any compressed bitmaps stored in a memory 114 for a printer to be rapidly decompressed, resulting in rapid printing of the bitmaps. In further embodiments the marking engine 118 is designed to natively process compressed bitmaps of print data, foregoing the need for decompression discussed in method 300 entirely.

In step 302, the compressed print job, including compressed bitmaps having compressed scanlines, is received. In one embodiment, this operation is performed by print controller 116 reading the compressed print job from memory.

In step 304, the next compressed bitmap of the print job is retrieved, such as by loading the compressed bitmap into Random Access Memory (RAM). A next scanline of the compressed bitmap is then read by the print controller 116 in step 306.

In step 308, the print controller 116 reads a tag for the scanline to confirm that a length of leading whitespace and trailing whitespace, plus the size of non-whitespace data (i.e., the data region, which includes non-blank pixels) for the scanline, is equal to a predefined scanline size for the bitmap (e.g., a horizontal dimension of the bitmap). This serves as a verification check to ensure that the scanline, when decompressed, matches a uniform size (e.g., one thousand and twenty-four pixels) defined for the entire bitmap and/or print job. If there is an inconsistency between these values, the print controller 116 reports a decompression error via a display or notification for review by a print shop operator. The print controller 116 may then trim or pad the scanline to match the predefined size, or replace the entire scanline with whitespace, then proceeds to the next scanline in step 306.

In step 310, the print controller 116 adds leading whitespace and trailing whitespace based on the values in the tag. The print controller 116 further decompresses the compressed non-whitespace data for the scanline, and positions the non-whitespace data between the leading whitespace and trailing whitespace. These operations may be performed, for example, via programmatic array or list operations.

In step 312, the print controller 116 reads the tag to determine a number of duplicated scanlines. The print controller 116 then adds additional duplicates of the scanline to the bitmap, based on the number of duplicates listed in the tag.

In step 314, the print controller 116 determines whether a last scanline has been reached. If not, processing returns to step 306. If so, processing continues to step 316, wherein the print controller 116 determines that the current bitmap has been successfully decompressed. The bitmap may then be sent to marking engine 118 for processing, or may await completion of the entire print job.

In step 318, the print controller 116 determines whether the last bitmap for the print controller 116 has been decompressed. If not the print controller 116 proceeds to step 304. If so, the print controller 116 determines that the entire print job has been decompressed in step 320.

After the entire print job has been decompressed, the entire print job is capable of being rapidly printed by the marking engine 118 in order to form a completed physical print job. In this manner, method 300 provides a technique for decompressing a compressed print job in order to prepare that print job for printing by a marking engine 118.

Figure 4:
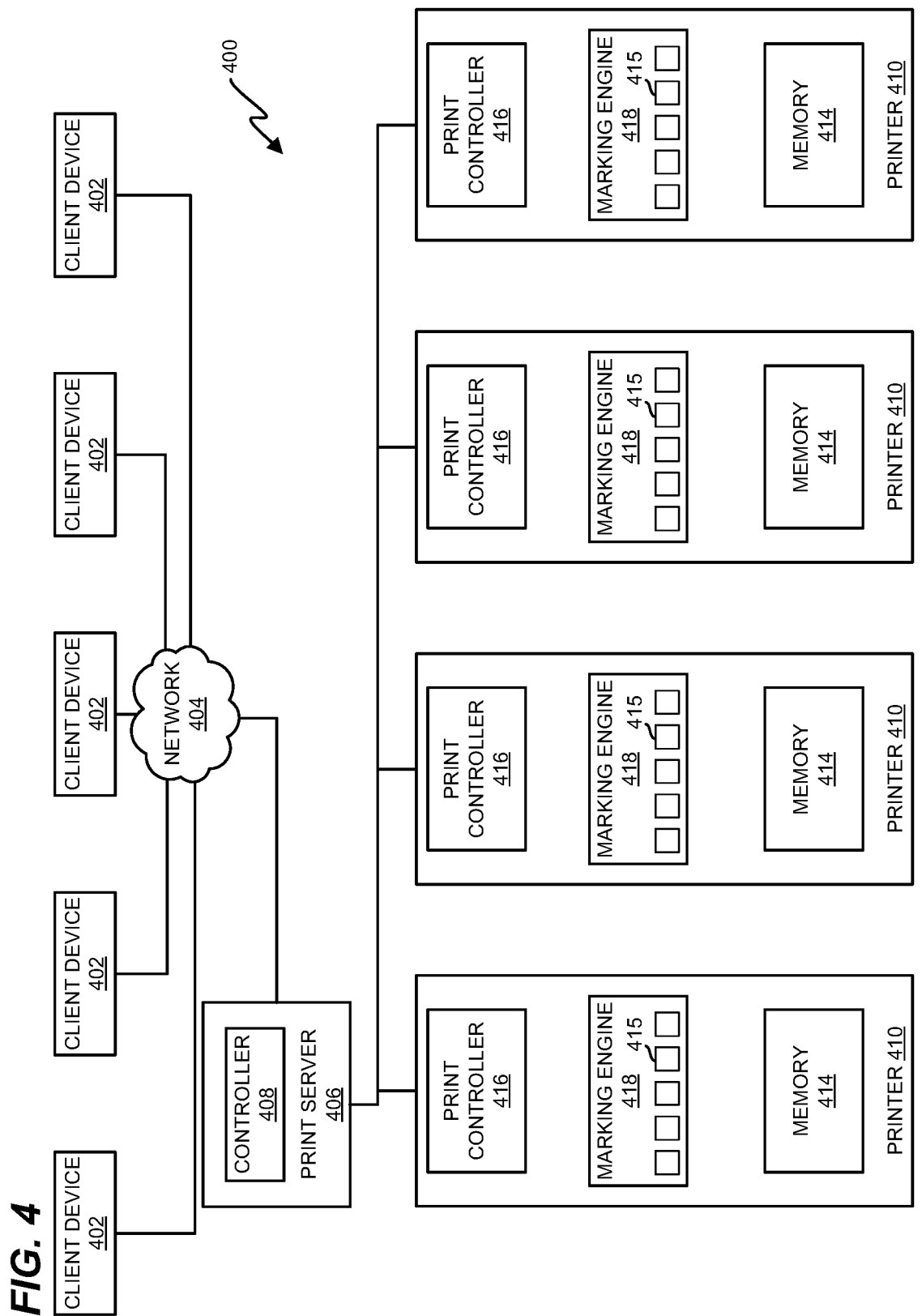
FIG. 4 is a block diagram of a print shop in an illustrative embodiment.

FIG. 4 is a block diagram of a print shop 400 in an illustrative embodiment. In this embodiment, multiple client devices 402 provide print jobs, comprising PDL print data accompanied by a JDF job ticket, to a print server 406 via a network 404 (e.g., the Internet). A controller 408 of the print server 406 distributes the print jobs across one or more printers 410. The printers 410 each include a print controller 416 which rasterizes, then compresses incoming print data for later processing, and stores the compressed rasterized print data in a queue in memory 414 for later printing. When the time arrives for a print job to be printed, the print controller 416 acquires the compressed rasterized print job from memory 114, decompresses the rasterized data for the print job, and provides the decompressed rasterized print data to marking engine 418 for printing. The marking engine 418 operates printheads 415 in order to mark a print media at the printer 410 in accordance with the print job. In further embodiments, dynamic compression and decompression is performed by controller 408 of the print server 406 (e.g., in order to save space in memory).

Figure 5:
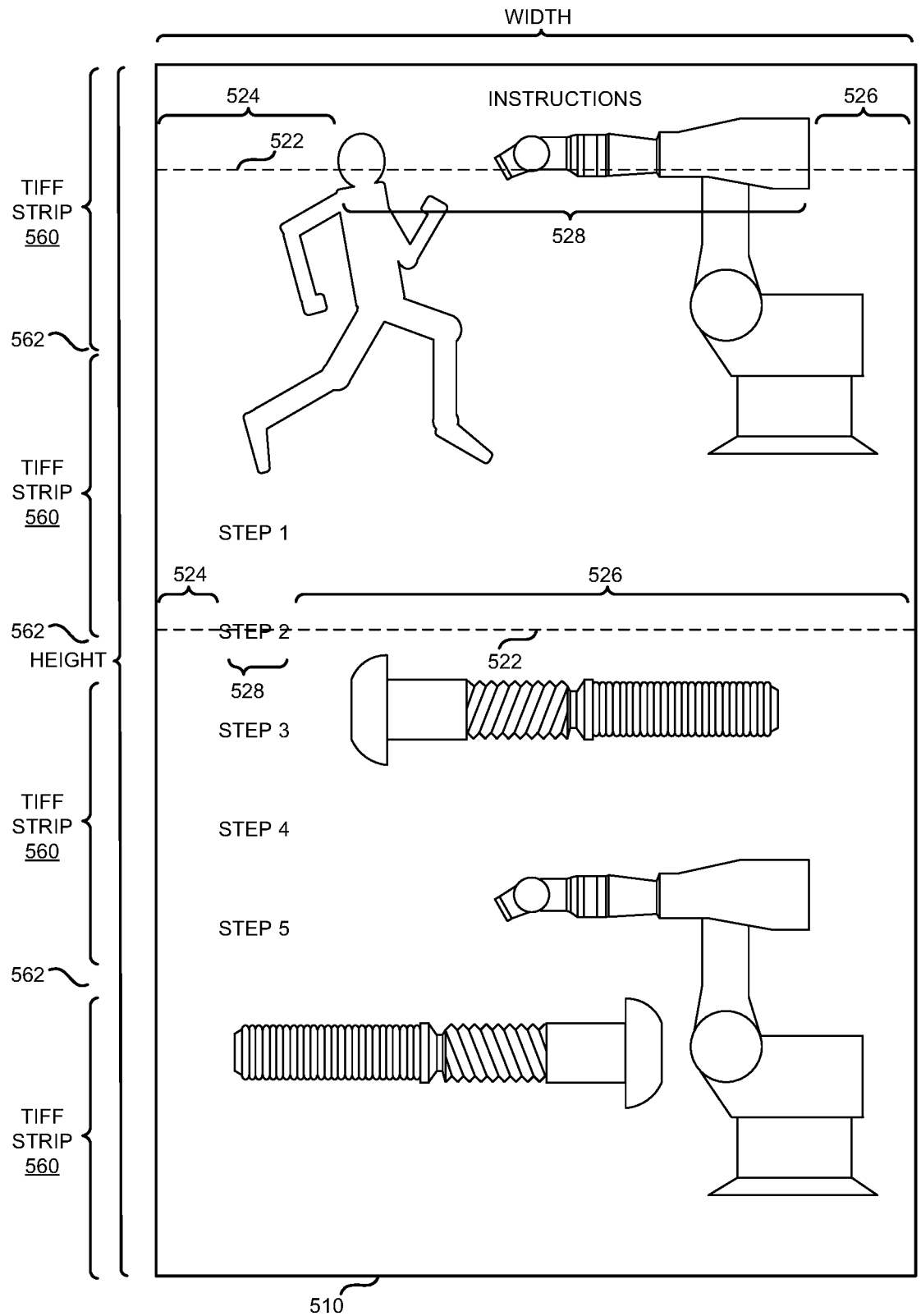
FIG. 5 is a diagram of a bitmap for compression in an illustrative embodiment.

FIG. 5 is a diagram of a bitmap 510 for compression in an illustrative embodiment. In this embodiment, the bitmap 510 comprises a Tag Image File Format (TIFF) bitmap having multiple TIFF strips 560 defining TIFF strip boundaries 562. The bitmap 510 is subdivided along its height into scanlines 522. Each scanline 522 comprises a single row of pixel values spanning the entire width of the bitmap 510. Thus, all scanlines 522 have the same length. Although the bitmap 510 is likely to include thousands of scanlines, only two are illustrated via dashed lines and numbered in this embodiment for the sake of clarity.

Depending on the contents of the bitmap itself, the amount of leading whitespace 524 and trailing whitespace 526 varies. As discussed above, leading whitespace 524 comprises the first set of contiguous pixels set to a value for whitespace (i.e., space that is not marked by the marking engine 118) before the first non-whitespace pixel in a scanline, and trailing whitespace 526 comprises the last set of contiguous pixels set to a value for whitespace after the last non-whitespace pixel in the scanline. Since the contents of each bitmap vary from page to page of the print job, and within each page of the print job, each scanline 522 may have a varying amount of leading whitespace 524 and trailing whitespace 526. For example, the uppermost of the scanlines 522 represented in dashed lines has more leading whitespace 524, and less trailing whitespace 526 than the lowermost of the scanlines 522 represented in dashed lines. The pixels disposed between the leading whitespace 524 and the trailing whitespace 526 are referred to as an uncompressed data region 528.

FIG. 6 is a diagram 600 that depicts uncompressed ones of scanlines 522 in illustrative embodiments. Specifically, FIG. 6 makes clear that each scanline 522 may exhibit a different amount of leading whitespace 524 and/or trailing whitespace 526. This in turn means that each uncompressed data region 528 may occupy a different amount of space, and be differently positioned within the scanline 522. Selectively running a compression scheme, such as the PackBits compression scheme or other suitable lossless compression scheme, on just the uncompressed data region 528 between the leading whitespace 524 and trailing whitespace 526 beneficially reduces the size of the scanline 522 when compressed, which saves space in memory.

Figure 7:
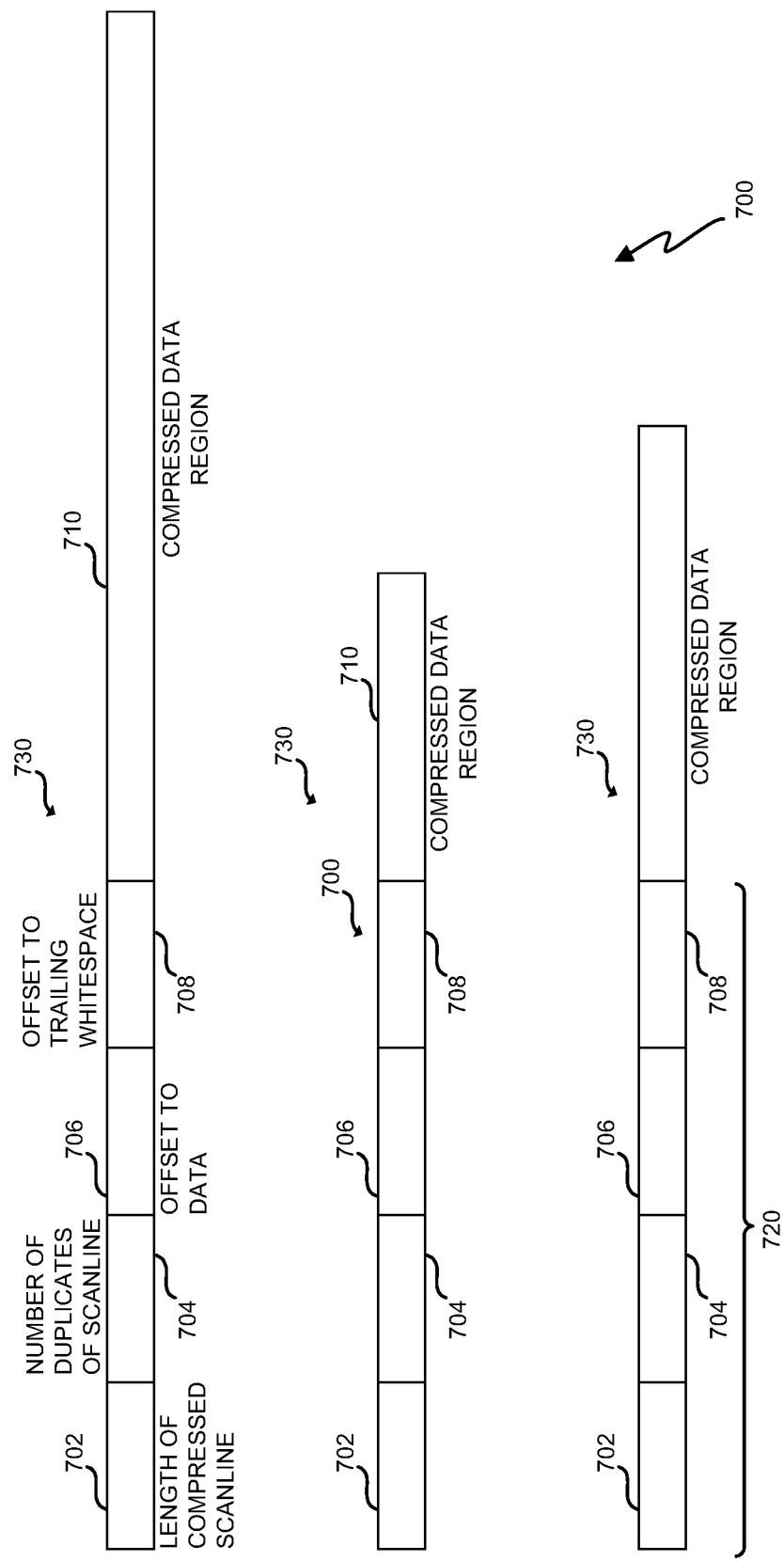
FIG. 7 is a diagram that depicts compressed scanlines in illustrative embodiments.

FIG. 7 is a diagram 700 that depicts multiples ones of compressed scanlines 730 in illustrative embodiments. In this embodiment, each scanline is represented by a tag 720, which may be positioned as a header, footer, or other accompanying piece of data. In this embodiment, the tag 720 includes whitespace offset information in the form of a field 702 indicating a length of the entirety of the compressed scanline 730 (e.g., including the tag 720), a duplication field 704 indicating a number of duplicates of the scanline, an offset field 706 indicating an offset (e.g., a byte offset) to the first non-whitespace pixel in the scanline, and an offset field 708 indicating an offset to the last non-whitespace pixel in the scanline. These fields may be read by a print controller 116 during decompression in order to verify, validate, and position the compressed data region 710 for the scanline. In further embodiments, the fields each comprise four bytes of data, which may be rapidly converted directly into an integer or long data type (e.g., uint16, uint32) during processing.

Although the offset field 708 is not necessary for the decompression process, the contents of the offset field 708 provide a technical benefit by enabling a verification of compressed scanline data. That is, if the length of the sum of: leading whitespace, non-whitespace data, and trailing whitespace, is not equal to a predefined scanline length, then a compression error may be present. For example, the print controller 116 may check the integrity of a compressed scanline 730 by decompressing the data region, inserting leading whitespace and trailing whitespace based on the tag, and comparing a resulting length of the decompressed data region, leading whitespace, and trailing whitespace to the predefined scanline length. In this manner, the offset field 708 facilitates rapid integrity checks, which in turn ensure that memory corruption is avoided in circumstances where compression has failed for a scanline.

Figure 8:
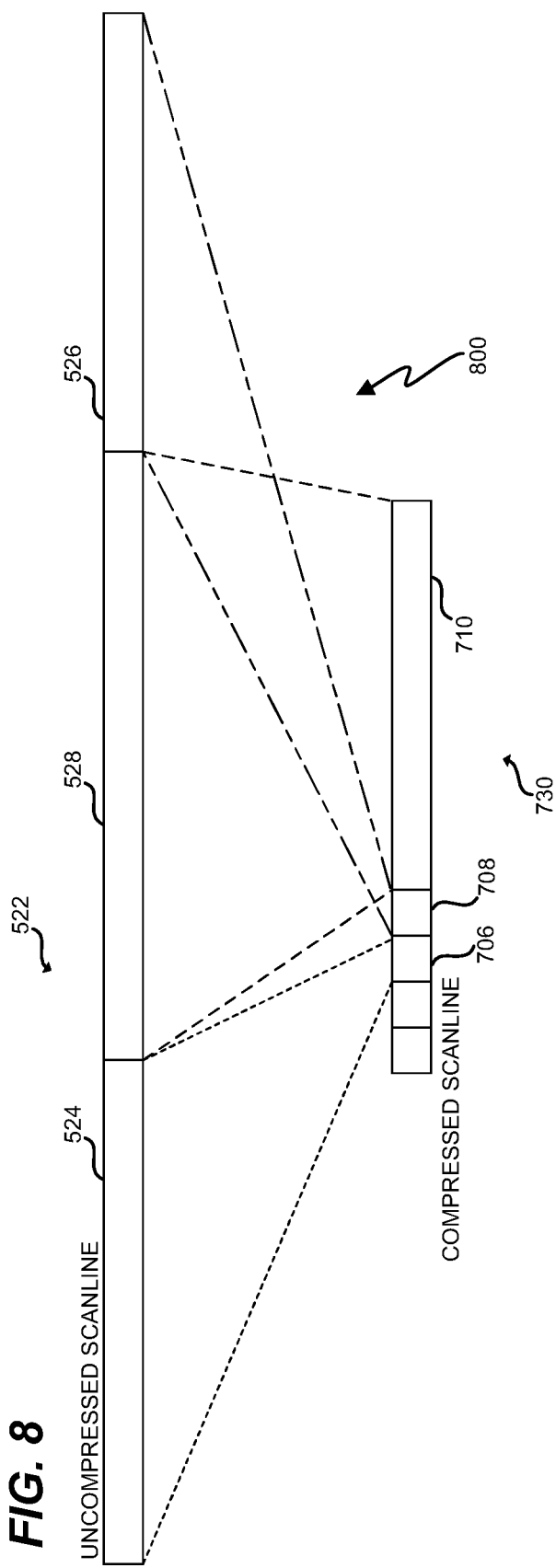
FIG. 8 is a diagram that depicts a correspondence between portions of an uncompressed scanline and a compressed scanline in an illustrative embodiment.

FIG. 8 is a diagram 800 that depicts a correspondence between portions of an uncompressed scanline and a compressed scanline in an illustrative embodiment. According to FIG. 8, the leading whitespace 524 for a scanline 522 is accounted for by offset field 706 of the compressed scanline 730. The trailing whitespace 526 is accounted for by offset field 708, and the non-whitespace data/pixels are accounted for by the compressed data region 710.

Examples

In the following examples, additional processes, systems, and methods are described in the context of a printing system that compresses rasterized print data for a print job.

A first clause is a system that includes an interface that receives rasterized print data, a memory that stores the rasterized print data; and a print controller that compresses each scanline of the rasterized print data by culling a region of leading whitespace, culling a region of trailing whitespace, compressing a data region disposed between the leading whitespace and the trailing whitespace, and inserting a tag having whitespace offset information for the data region within the scanline.

A further clause is a system of the first clause wherein the print controller is further configured to check integrity of a compressed scanline by decompressing the data region, inserting leading whitespace and trailing whitespace based on the tag, and comparing a resulting length of the decompressed data region, leading whitespace, and trailing whitespace to a predefined scanline length.

A further clause is a system of the first clause wherein the print controller is further configured to determine that a next scanline is a duplicate of a previous scanline, to forego compression of the next scanline and delete the next scanline, and to update a duplication field of a tag of the previous scanline.

A further clause is a system of the clause above wherein the rasterized print data comprises Tag Image File Format (TIFF) images, and the print controller is further configured to prevent deleting the next scanline in response to determining that the next scanline is separated from the previous scanline by a TIFF strip boundary.

A further clause is a system of the first clause wherein the print controller is further configured to transmit the scanlines that have been compressed.

A further clause is a system of the first clause wherein the print controller is further configured to compress the data region according to a PackBits compression scheme.

A further clause is a system of the first clause wherein the rasterized print data comprises bitmaps that each correspond with a logical page of a print job for the print data, and the print controller is further configured to compress each scanline of each bitmap for the print job.

A further clause is a system of the first clause wherein the interface, memory, and print controller are components of a printer, and the system further comprises the printer.

A second clause is a method that includes storing rasterized print data, and compressing each scanline of the rasterized print data, by: culling a region of leading whitespace, culling a region of trailing whitespace, compressing a data region disposed between the leading whitespace and the trailing whitespace, and inserting a tag having whitespace offset information for the data region within the scanline.

A further clause is the method of the second clause further comprising checking integrity of a scanline that has been compressed, by: decompressing the data region; inserting leading whitespace and trailing whitespace based on the tag; and comparing a resulting length of the decompressed data region, leading whitespace, and trailing whitespace to a predefined scanline length.

A further clause is the method of the second clause further comprising determining that a next scanline is a duplicate of a previous scanline; foregoing compressing of the next scanline; deleting the next scanline; and updating a duplication field of a tag of the previous scanline.

A further clause is the method of the clause above wherein the rasterized print data comprises Tag Image File Format (TIFF) images; and the method further comprises preventing deleting the next scanline in response to determining that the next scanline is separated from the previous scanline by a TIFF strip boundary.

A further clause is the method of the second clause further comprising transmitting the scanlines that have been compressed.

A further clause is the method of the second clause wherein compressing the data region is performed according to a PackBits compression scheme.

A further clause is the method of the second clause wherein the rasterized print data comprises bitmaps that each correspond with a logical page of a print job for the print data, and the method further comprises compressing each scanline of each bitmap for the print job.

A third clause is a non-transitory computer readable medium embodying programmed instructions which, when executed by a processor, are operable for performing a method. The method includes storing rasterized print data, and compressing each scanline of the rasterized print data, by: culling a region of leading whitespace, culling a region of trailing whitespace, compressing a data region disposed between the leading whitespace and the trailing whitespace, and inserting Embodiments disclosed herein can take the form of software, hardware, firmware, or various combinations thereof.

A further clause is the non-transitory computer readable medium of the third clause wherein the instructions are further operable for checking integrity of a scanline that has been compressed, by: decompressing the data region; inserting leading whitespace and trailing whitespace based on the tag; and comparing a resulting length of the decompressed data region, leading whitespace, and trailing whitespace to a predefined scanline length.

A further clause is the non-transitory computer readable medium of the third clause wherein the instructions are further operable for determining that a next scanline is a duplicate of a previous scanline; foregoing compressing of the next scanline; deleting the next scanline; and updating a duplication field of a tag of the previous scanline.

A further clause is the non-transitory computer readable medium of the third clause wherein the rasterized print data comprises Tag Image File Format (TIFF) images; and the method further comprises preventing deleting the next scanline in response to determining that the next scanline is separated from the previous scanline by a TIFF strip boundary.

A further clause is the non-transitory computer readable medium of the third clause wherein the instructions are further operable for transmitting the scanlines that have been compressed.

Figure 9:
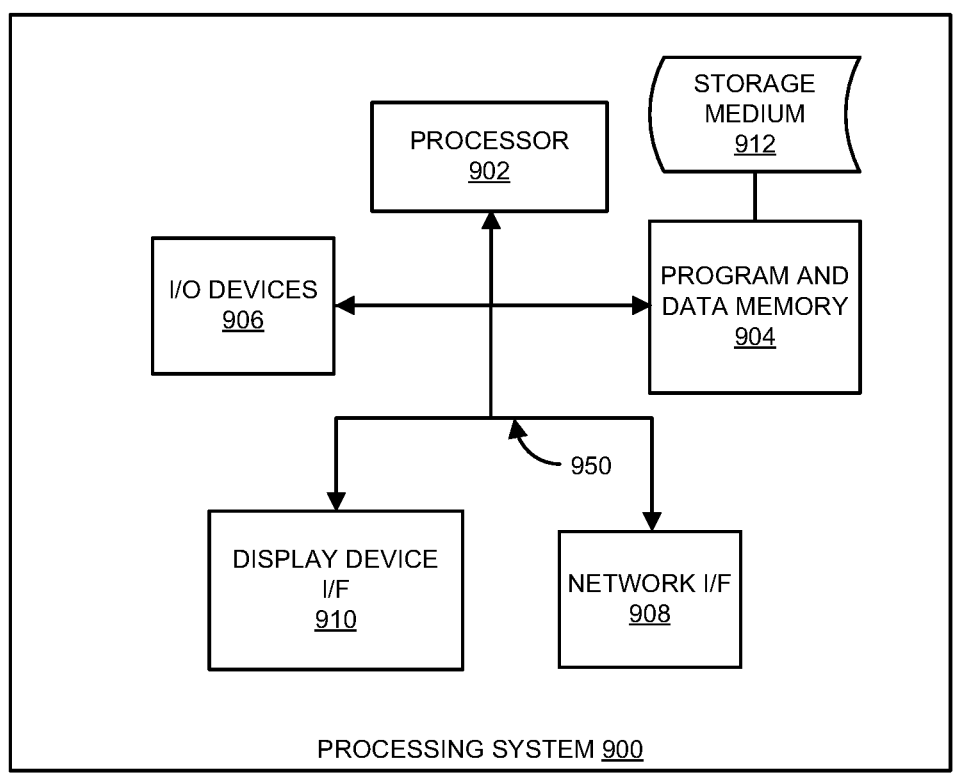
FIG. 9 illustrates a processing system operable to execute a computer readable medium embodying programmed instructions to perform desired functions in an illustrative embodiment.

In one particular embodiment, software is used to direct a processing system of printing system 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system comprising:
    an interface configured to receive rasterized print data;
    a memory configured to store the rasterized print data; and
    a print controller configured to compress each scanline of the rasterized print data by culling a region of leading whitespace, culling a region of trailing whitespace, compressing a data region disposed between the leading whitespace and the trailing whitespace, and inserting a tag having whitespace offset information for the data region within the scanline.

2. The system of claim 1 wherein:
    the print controller is further configured to check integrity of a compressed scanline by decompressing the data region, inserting leading whitespace and trailing whitespace based on the tag, and comparing a resulting length of the decompressed data region, leading whitespace, and trailing whitespace to a predefined scanline length.

3. The system of claim 1 wherein:
    the print controller is further configured to determine that a next scanline is a duplicate of a previous scanline, to forego compression of the next scanline and delete the next scanline, and to update a duplication field of a tag of the previous scanline.

4. The system of claim 3, wherein:
    the rasterized print data comprises Tag Image File Format (TIFF) images; and
    the print controller is further configured to prevent deleting the next scanline in response to determining that the next scanline is separated from the previous scanline by a TIFF strip boundary.

5. The system of claim 1 wherein:
    the print controller is further configured to transmit the scanlines that have been compressed.

6. The system of claim 1 wherein:
    the print controller is further configured to compress the data region according to a PackBits compression scheme.

7. The system of claim 1 wherein:
    the rasterized print data comprises bitmaps that each correspond with a logical page of a print job for the print data, and
    the print controller is further configured to compress each scanline of each bitmap for the print job.

8. The system of claim 1, wherein:
    the interface, memory, and print controller are components of a printer, and the system further comprises the printer.

9. A method comprising:
    storing rasterized print data; and
    compressing each scanline of the rasterized print data, by:
        culling a region of leading whitespace;
        culling a region of trailing whitespace;
        compressing a data region disposed between the leading whitespace and the trailing whitespace; and
        inserting a tag having whitespace offset information for the data region within the scanline.

10. The method of claim 9 further comprising:
    checking integrity of a scanline that has been compressed, by:
        decompressing the data region;
        inserting leading whitespace and trailing whitespace based on the tag; and
        comparing a resulting length of the decompressed data region, leading whitespace, and trailing whitespace to a predefined scanline length.

11. The method of claim 9 further comprising:
    determining that a next scanline is a duplicate of a previous scanline;
    foregoing compressing of the next scanline;
    deleting the next scanline; and
    updating a duplication field of a tag of the previous scanline.

12. The method of claim 11, wherein:
    the rasterized print data comprises Tag Image File Format (TIFF) images; and
    the method further comprises preventing deleting the next scanline in response to determining that the next scanline is separated from the previous scanline by a TIFF strip boundary.

13. The method of claim 9 further comprising:
    transmitting the scanlines that have been compressed.

14. The method of claim 9 wherein:
    compressing the data region is performed according to a PackBits compression scheme.

15. The method of claim 9 wherein:
    the rasterized print data comprises bitmaps that each correspond with a logical page of a print job for the print data, and
    the method further comprises compressing each scanline of each bitmap for the print job.

16. A non-transitory computer readable medium embodying programmed instructions which, when executed by a processor, are operable for performing a method comprising:
    storing rasterized print data; and
    compressing each scanline of the rasterized print data, by:
        culling a region of leading whitespace;
        culling a region of trailing whitespace;
        compressing a data region disposed between the leading whitespace and the trailing whitespace; and
        inserting a tag having whitespace offset information for the data region within the scanline.

17. The non-transitory computer readable medium of claim 16 wherein the instructions are further operable for:
    checking integrity of a scanline that has been compressed, by:
        decompressing the data region;
        inserting leading whitespace and trailing whitespace based on the tag; and
        comparing a resulting length of the decompressed data region, leading whitespace, and trailing whitespace to a predefined scanline length.

18. The non-transitory computer readable medium of claim 16 wherein the instructions are further operable for:

determining that a next scanline is a duplicate of a previous scanline;

foregoing compressing of the next scanline;

deleting the next scanline; and updating a duplication field of a tag of the previous scanline.

19. The non-transitory computer readable medium of claim 18, wherein:

the rasterized print data comprises Tag Image File Format (TIFF) images; and the method further comprises preventing deleting the next scanline in response to determining that the next scanline is separated from the previous scanline by a TIFF strip boundary.

20. The non-transitory computer readable medium of claim 16 wherein the instructions are further operable for:

transmitting the scanlines that have been compressed.

* * * * *